Figure 1:

Nov. 4, 1958  F. K. DAGGETT  2,858,854
FLEXIBLE TUBING
Filed Nov. 8, 1954

INVENTOR.
Frederick K. Daggett
BY

ATTORNEYS

United States Patent Office 2,858,854
Patented Nov. 4, 1958

2,858,854

FLEXIBLE TUBING

Frederick K. Daggett, Pine Orchard, Conn., assignor to The Flexible Tubing Corporation, Guilford, Conn., a corporation of Connecticut Application November 8, 1954, Serial No. 467,381

8 Claims. (Cl. 138—56)

This invention relates to flexible tubing and is directed to the provision of a tubing of a novel construction whereby desirable characteristics are attained in a marked degree including lightness of weight, high flexibility, reduction of vibration and deadening of noise. The tubing is well adapted for use in air-conditioning systems for the conveyance of air at the pressures used in such systems, particularly so because its wall is non-porous and it has a high degree of corrosion resistance, axial tensile strength and strength to resist crushing under forces applied externally. In addition to possessing the properties indicated in a marked degree, the new tubing may be installed quickly and inexpensively and is adapted for manufacture at low cost.

One of the distinctive features of the tubing of this invention lies in the construction of its flexible wall. This wall is a composite sheet including a layer of a fibrous material, and, on either side of this layer a sheet of metal foil permanently adhered or bonded to the fibrous layer over its entire area. This foil, by reason of its thinness, is readily flexible and at the same time supplies metallic surfaces for the sides of the composite sheet. Preferably aluminum foil is employed, though the foils of other metals may also be used.

The fibrous sheet is preferably fiber glass which is tough, flexible and fire-resistant and in all respects is well adapted for this use. The fiber glass may be a woven fabric of glass fibers or it may be a fiber glass sheet in which the fibers are matted instead of being woven; such a matted fiber glass sheet serves the purpose very well and is less expensive than the woven fiber glass sheet.

The composite sheet is formed by applying a plastic coating of a suitable elastomeric material such as a phenol resin, to opposite sides of the fiber glass sheet and then pressing the sheets of foil against opposite sides of the coated fiber glass sheet to cause them to adhere and present a smooth metallic surface on each side of the composite sheet. This is best done by passing the three sheets between rollers which apply pressure at opposite sides and thereby form the composite sheet.

The tubing of this invention preferably consists of a helical non-corrosive or corrosive-resistant wire and a flexible sheet of the type described above applied over the wire as a spiral wrapping. The composite sheet is cut to the form of long strips and these strips are wound helically upon the wire with the edges of adjacent convolutions overlapped and caused to adhere.

Another feature of the invention resides in the method employed in forming the tubing. The wire used is wound helically to the desired diameter. Preferably the wire is not tensioned to either expand or contract in the direction of the axis of the helix. This coil of wire is suitably supported with the convolutions spaced apart regularly by a short distance and a thin layer of a special adhesive is then applied to the outer surface only of each of the convolutions. This adhesive is of a type designed for effecting a metal-to-metal bond, and, as stated, it is applied to the outer side only of the wire. Then a long strip of the composite sheet is applied helically over the wire with the edges of the adjacent convolutions overlapping and an adhesive is introduced between these overlapping edges. Thus the over-lapping edges of the convolutions of the composite sheet are united, and also the inner surface of the composite sheet is caused to adhere to the outer surface of the convolutions of the coil of wire, this outer union being effected by the adhesive coating on the exterior surface of the wire effecting a bond between the metal of the wire and the inner foil of the composite sheet.

The tube thus constructed may be withdrawn from the supporting structure upon which it is formed and may then be compressed axially more or less. When the tube is subjected to such a compressing force, the adhesion between the outer surface of the wire throughout its length and the inner surface of the composite sheet remains intact with the result that the portions of the composite sheet lying between adjacent convolutions of the wire flex inwardly a short distance quite regularly throughout the length of the tubing; and, of course, these shallow inward folds of the surface material are taken up quite regularly when the tube is expanded axially. A flexible tube so constructed presents many advantageous features as will be indicated herein.

Figure 2:
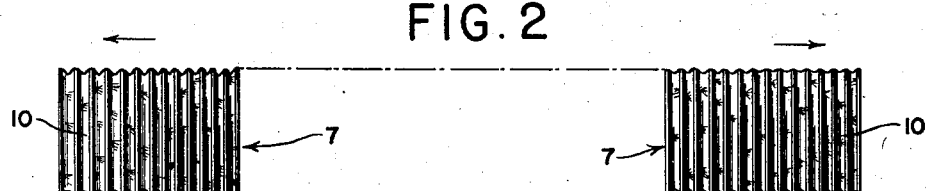
Figure 3:
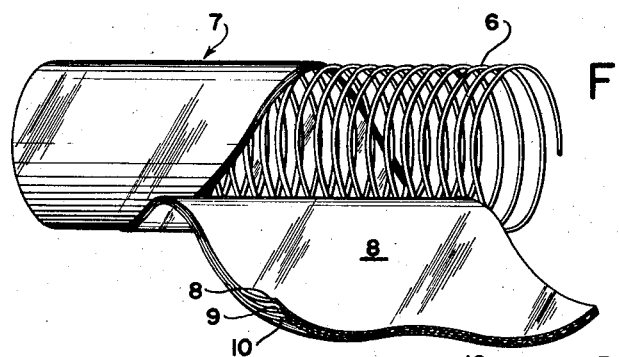

The preferred embodiment of the invention is illustrated in the drawing annexed hereto wherein Figs. 1 and 2 are views of the tubing in elevation, Fig. 1 showing the tube contracted axially and Fig. 2 showing it expanded somewhat, but not fully. Fig. 3 is a view in which the strip of the composite sheet is partially unwound from the coil of wire, and Figs. 4 and 5 are views on a larger scale showing the tube wall in section, Fig. 4 showing the tube extended axially to substantially the full extent and Fig. 5 showing it contracted.

Referring first to Figs. 1, 2 and 3, the preferred embodiment of the new tubing consists of a helically formed wire and an elongated strip of a composite structure applied helically over the helix of wire with the edges of the consecutive convolutions of the strip overlapping and secured together. The coil of wire is shown at 6. Preferably it is not under tension to either expand or contract axially. The strip constituting the flexible side wall of the tubing is shown at 7, and, as appears in Fig. 3, it is a composite of three layers indicated at 8, 9 and 10. The middle one of these three layers indicated at 9, is a sheet of fiber glass which may be either fiber glass fabric or a fiber glass sheet in which the fibers are matted. A polymeric film, such as phenol resin, is applied to opposite sides of the fiber glass sheet, and then sheets of metal foil, preferably aluminum foil, designated 8 and 10, are applied to opposite sides of the fiber glass sheet and caused to adhere thereto over their entire areas by the adhesive coating. Preferably the uniting of these three layers is effected by passing them between rollers while subjecting them to an elevated temperature, the resultant product being a tripartite sheet which has metal surfaces but which possesses all of the necessary flexibility. The polymeric film may be a film of thermoplastic or thermosetting polymers which, in addition to effecting the bond or weld between the plies of the composite sheet, constitutes a barrier to leakage of air through the interstices of the fibrous sheet.

In the preferred construction and method of operation, provision is made for uniting the convolutions of the coil 6 with the metal foil immediately overlying them. To this end, an adhesive is employed of a type adapted for making a metal-to-metal seal and this adhesive is applied to the outer portions only of the convolutions of coil 6. This adhesive is indicated at 11 in Figs. 4 and 5.

Figure 4:
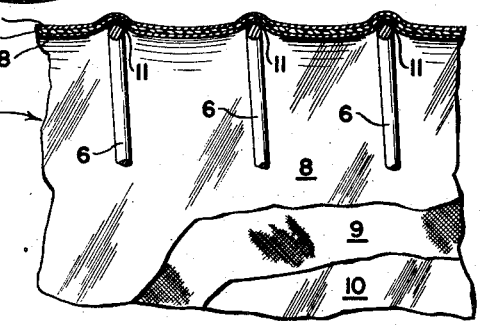
Figure 5:
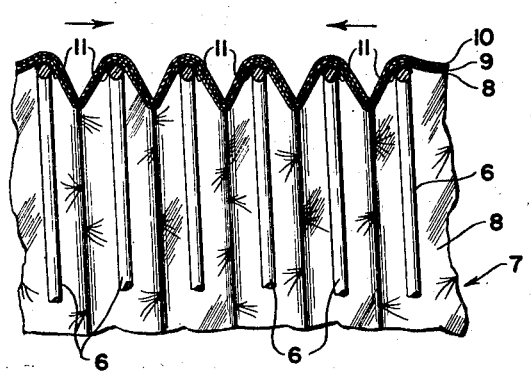

When forming the tubing, the convolutions of the coiled wire are spread somewhat as is indicated in Figs. 3 and 4 and the strip of the flexible wall material is applied to the surface of the helix of wire, and, as the strip is pressed down upon the exterior of the coil in the process of so applying it, the inner sheet of foil 8 becomes pressed upon the adhesive 11 on the outer surface of the coil 6, and this adhesive effects a bond between the wire and the foil, as is illustrated in Fig. 4.

When the formation of a length of flexible tubing in this way has been completed, the piece of tubing may be compressed axially somewhat and it assumes the condition illustrated in Fig. 5. The adhesion of the inner foil 8 to the wire 11 holds during this contraction of the length of the tube and the portions of the tube wall lying between adjacent convolutions of the coil bend inwardly as shown. This inward bending of the flexible wall material is not as uniform as is indicated by the sectioning of the wall in Fig. 5, there being numerous slight foldings or indentations of the flexible material as is indicated in Fig. 5 on the surface of the wall material below the sectioning. All this folding is incident to contracting the length of a piece of tubing and the folds are straightened out more or less when the tubing is again extended. The application of but little force is all that is needed to either extend or contract the tubing because the wall material of the tubing possesses adequate flexibility, but the structure of the composite sheet including the metal foils offers some little opposition to extending or contracting. One result is that the tubing will remain in any condition of extension or contraction to which it is moved. Also, the tubing may be bent in any direction, and, in so bending, the folds of the flexible material on the outside of the bend straighten out while those on the inside of the bend remain in their former relation or are contracted somewhat.

A flexible tubing of the construction described possesses many attributes adapting it for practical use. It is of special utility in air-conditioning systems, particularly those of the type known as high pressure systems. The tubing can be extended and compressed over a considerable range, even to the extent that its contracted length is about one-half of its extended length. Also, it may be bent in any direction on a short radius, even to the extent of a radius of half the diameter of the tubing. These are particularly desirable characteristics in air-conditioning systems wherein it is often necessary to carry an air line around an obstruction of one kind or another, such as water pipes and the supporting members of a floor structure. Also, the flexibility of the tubing readily offsets any misalignment of the parts of the air-conditioning system which have been stationarily mounted.

Another feature of this improved tubing relates to the ease with which it may be installed. A worker engaged in installing an air-conditioning system may carry a length of the tubing with him as he mounts to an elevated position for installing parts below a ceiling, and, while in that position, he can cut the tubing to the length found to be desirable. This cutting operation can be done quite readily with a pocket knife and diagonal side-cutters for the wire.

This flexible tubing has many other advantages. It is of light weight, it is flame resistant in that a flame may be played upon it without damage to it, it is, in a practical sense, leak-proof and impervious to the entrance of water, it has good air-flow characteristics, greatly superior to those of rigid metallic duct systems, and it absorbs expansion and contraction of elements of an installation which are connected by it. Its acoustical absorption is pronounced so that it serves as a sound deadener in an air-conditioning system and the passageway through the tubing is contracted in size to a very small extent when the tubing is bent around a curve because the inward flexing of the material of the wall of the tubing is uniformly distributed.

Thus, the new tubing possesses many, if not all, of the meritorious features of metal ducting combined with the advantages resulting from its flexibility.

I claim:
1. A flexible tubing comprising a helical coil of wire and a flexible covering over the coil of wire consisting of a fibrous sheet having sheets of metal foil applied to its opposite surfaces and adhered thereto over the entire area thereof and having the inner surface of the inner foil sheet adhered to the outer surfaces of the convolutions of the helical coil.

2. A flexible tubing comprising a helix of wire supporting a covering consisting of a sheet of fiberglass and sheets of metal foil adhered to the opposite sides of the fiberglass sheet over the entire area thereof and having the inner foil sheet adhered to the outer surfaces of the convolutions of the wire helix.

3. A flexible tubing comprising a helix of wire and a covering over the wire built up of a sheet of fiberglass, a coating of elastomeric material such as a phenol resin on both sides of the fiberglass sheet and sheets of metal foil adhered to the fiberglass sheet over their entire area by the coatings of the elastomeric material, the covering being secured to the helix of wire by an adhesive joining the inner layer of foil to the outer surface of each convolution of the helix.

4. A flexible tubing in accordance with claim 2 in which the fiberglass sheet is a woven sheet in the form of a long strip which is wound helically on the wire helix with the lateral edges of successive convolutions of the strip overlapping and adhered together.

5. A flexible tubing comprising a helix of wire supporting a composite covering consisting of a sheet of woven fiberglass having sheets of aluminum foil applied to the inner and outer faces of the woven fiberglass sheet and adhered thereto over the entire area thereof, the inner aluminum foil sheet being bonded to the outer surfaces of the convolutions of the wire helix over the area of their contact.

6. A flexible tubing comprising a helix of wire supporting a composite covering consisting of a sheet of woven fiberglass having sheets of aluminum foil applied to the inner and outer faces of the woven fiberglass sheet and adhered thereto over the entire area thereof, the inner aluminum foil sheet being secured against movement relative to the coils of the wire helix axially of the latter.

7. A flexible tubing comprising a helix of wire and a covering over the wire built up of a sheet of fiberglass, a coating of elastomeric material such as a phenol resin on both sides of the fiberglass sheet and sheets of metal foil adhered to the fiberglass sheet over their entire area by the coatings of the elastomeric material, the covering being secured against relative movement axially of the helix of wire by the inner layer of foil being secured against movement relative to the coils of said helix of wire axially of the latter.

8. A flexible tubing comprising a helix of wire supporting a covering consisting of a sheet of fiberglass and sheets of metal foil adhered to the opposite sides of the fiberglass sheet over the entire area thereof and having the inner foil sheet secured against movement relative to the coils of said wire helix axially of the latter.

References Cited in the file of this patent

UNITED STATES PATENTS

| 1,909,862 | Honegger | May 16, 1933 |
| 1,937,069 | Rado | Nov. 28, 1933 |
| 2,007,883 | Spahn | July 9, 1935 |
| 2,355,584 | Douglas | Aug. 8, 1944 |
| 2,467,999 | Stephens | Apr. 19, 1949 |
| 2,475,389 | Hersey | July 5, 1949 |
| 2,525,070 | Greenwald et al. | Oct. 10, 1950 |
| 2,698,991 | Mesick | Jan. 11, 1955 |

FOREIGN PATENTS

| 399,304 | Great Britain | Oct. 5, 1933 |